(12) United States Patent
Arroyo et al.

(10) Patent No.: US 11,908,115 B2
(45) Date of Patent: Feb. 20, 2024

(54) IMAGE TRANSFORMATION USING INTERPRETABLE TRANSFORMATION PARAMETERS

(71) Applicant: Google LLC, Mountain View, CA (US)

(72) Inventors: Diego Martin Arroyo, Zürich (CH); Alessio Tonioni, Zürich (CH); Federico Tombari, Zug (CH)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 18/161,415

(22) Filed: Jan. 30, 2023

(65) Prior Publication Data

US 2023/0169635 A1 Jun. 1, 2023

Related U.S. Application Data

(62) Division of application No. 17/052,049, filed as application No. PCT/US2020/016822 on Feb. 5, 2020, now Pat. No. 11,599,980.

(51) Int. Cl.
*G06K 9/62* (2022.01)
*G06T 5/50* (2006.01)
*G06N 3/08* (2023.01)

(52) U.S. Cl.
CPC ............. *G06T 5/50* (2013.01); *G06N 3/08* (2013.01); *G06T 2207/20081* (2013.01); *G06T 2207/20084* (2013.01); *G06T 2207/20092* (2013.01)

(58) Field of Classification Search
CPC ............ G06T 5/50; G06T 2207/20081; G06T 2207/20084; G06T 2207/20092;
(Continued)

(56) References Cited

U.S. PATENT DOCUMENTS

2019/0205749 A1* 7/2019 Tan ..................... G06N 3/047
2019/0333623 A1* 10/2019 Hibbard ............... A61N 5/1039
2020/0302656 A1* 9/2020 Kumar ................. G06F 3/04845
2022/0318956 A1* 10/2022 Xu ....................... G06T 11/008

FOREIGN PATENT DOCUMENTS

CN 109584337 4/2019
CN 109584337 A * 4/2019 ........... G06N 3/0454
(Continued)

OTHER PUBLICATIONS

Choi et al., "StarGAN: Unified Generative Adversarial Networks for Multi-Domain Image-to-Image Translation", 2018 Institute of Electrical and Electronics Engineers Conference on Computer Vision and Pattern Recognition, Sep. 21, 2018, 16 pages.
(Continued)

*Primary Examiner* — Xin Jia
(74) *Attorney, Agent, or Firm* — Dority & Manning, P.A.

(57) ABSTRACT

A computer-implemented method to perform image-to-image translation. The method can include obtaining one or more machine-learned generator models. The one or more machine-learned generator models can be configured to receive an input image and a user-specified conditioning vector that parameterizes one or more desired values for one or more defined characteristics of an output image. The one or more machine-learned generator models can be configured to perform, based at least in part on the user-specified conditioning vector, one or more transformations on the input image to generate the output image with the one or more desired values for the one or more defined characteristics. The method can include receiving the input image and the user-specified conditioning vector. The method can include generating, using the machine-learned generator model, an output image having the one or more desired values for the one or more characteristics.

9 Claims, 9 Drawing Sheets

(58) Field of Classification Search
CPC ....... G06T 11/00; G06T 11/001; G06T 15/50; G06N 3/08; G06N 3/0454; G06N 3/084; G06N 20/00
See application file for complete search history.

(56) References Cited

FOREIGN PATENT DOCUMENTS

| CN | 110097543 | 8/2019 |
|---|---|---|
| CN | 110119808 | 8/2019 |

OTHER PUBLICATIONS

International Preliminary Report on Patentability for Application No. PCT/US2020/016822, dated Aug. 18, 2022, 10 pages.
International Search Report and Written Opinion for Application No. PCT/US2020/016822, dated Oct. 30, 2020, 5 pages.
Kaneko et al., "Generative Attribute Controller with Conditional Filtered Generative Adversarial Networks", 2017 Institute of Electrical and Electronics Engineers Conference on Computer Vision and Pattern Recognition, Jul. 21, 2017, pp. 7006-7015.
Liu et al., "Unsupervised Image-to-Image Translation Networks", arXiv:1703.00848v1, 19 pages.
Yi et al., "DualGAN: Unsupervised Dual Learning for Image-to-Image Translation" 2017 Institute of Electrical and Electronics Engineers International Conference on Computer Vision, Oct. 22, 2017, pp. 2868-2876.
Zbu et al., "Unpaired Image-to-Image Translation using Cycle-Consistent Adversarial Networks", arXiv:1703.10593v1, 18 pages.

* cited by examiner

IMAGE TRANSFORMATION USING INTERPRETABLE TRANSFORMATION PARAMETERS

PRIORITY CLAIM

This application is based upon and claims the right of priority under 35 U.S.C. § 371 to International Application No. PCT/US2020/016822 filed on Feb. 5, 2020, and U.S. patent application Ser. No. 17/052,049, filed Oct. 30, 2020. Applicant claims priority to and the benefit of each of such applications and incorporates all such applications herein by reference in their entirety.

FIELD

The present disclosure relates generally to using machine-learned model(s) to perform image transformations according to interpretable user-specified parameters.

BACKGROUND

Image transformation has generally been performed manually using image manipulation software. As an example, an image depicting an environment in the summer can be transformed to depict the same environment in the winter using image manipulation techniques. Recently, machine-learned models (e.g., neural networks, etc.) have been trained and used to perform these image transformations.

However, these image transformation models are generally incapable of providing fine-grained control of specific interpretable characteristics of the image that is to be transformed. As an example, such image transformation models are generally incapable of controlling the degree to which a transformation is applied. Further, such image transformation models are generally only capable of providing image transformations of a single type.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to perform image-to-image translation. The method can include obtaining, by a computing system comprising one or more computing devices, a machine-learned generator model. The machine-learned generator model can be configured to receive an input image and a user-specified conditioning vector that parameterizes one or more desired values for one or more defined characteristics of an output image. The machine-learned generator model can be further configured to perform, based at least in part on the user-specified conditioning vector, one or more transformations on the input image to generate the output image with the one or more desired values for the one or more defined characteristics. The method can include receiving, by the computing system, the input image and the user-specified conditioning vector. The method can include generating, by the computing system and using the machine-learned generator model, an output image having the one or more desired values for the one or more characteristics.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

DETAILED DESCRIPTION

Overview

Figure 1:
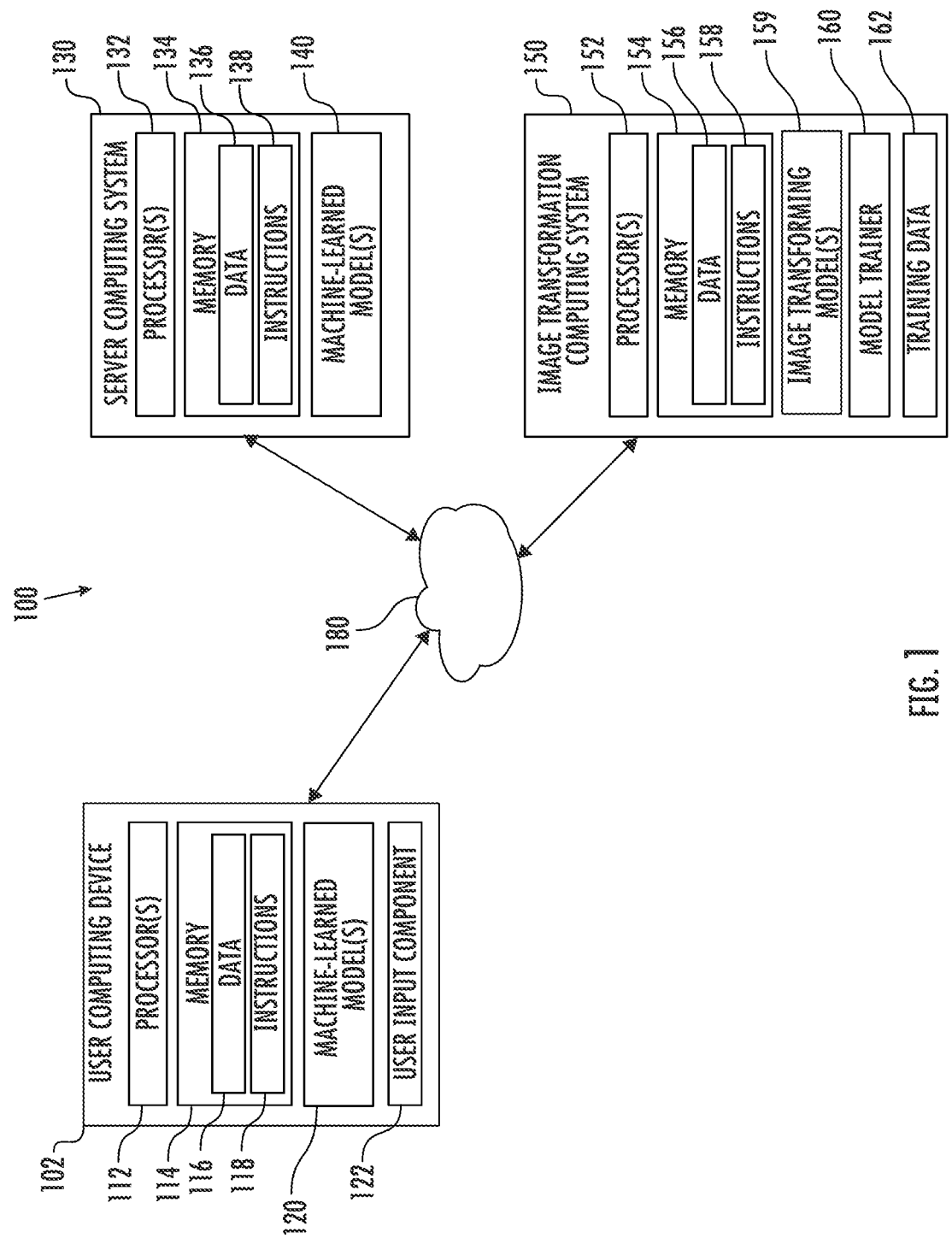
FIG. 1 depicts a block diagram of an example computing system according to example embodiments of the present disclosure

Example embodiments of the present disclosure are directed to performing transformations of images using machine-learned model(s) and interpretable user-specified parameters that control the transformations. More specifically, the machine-learned model can be used to perform transformation(s) on an image based on different parameter(s) of a user-specified conditioning vector. The user can specify desired values for defined characteristics of a transformation (e.g., area of transformation, degree of transformation, etc.) for one or more transformations of the defined characteristic(s) (e.g., transforming summer to winter, transforming day-time lighting to night-time lighting, transforming location of a light source, etc.). The user-desired values can be parameterized in the user-specified conditioning vector. As an example, a user may wish to transform an image that depicts a summer environment to an image that depicts a winter environment. The user-specified conditioning vector can include parameters that indicate the type(s) of transformation(s) the user desires (e.g., summer to winter, etc.) and/or the degree of transformation desired (e.g., a full winter transformation, a partial winter transformation, etc.).

The machine learned model(s) can receive the input image and the user-specified conditioning vector and transform the input image based on the user's desired values for the defined characteristics of an output image. Specifically, the output image can correspond to the input image transformed to have the desired values for the defined characteristic(s). Thus, in the example given above, if the user-specified conditioning vector indicates a 60% transformation of the input image that depicts the summer environment, the output image can depict the same scene but transformed 60% into a winter environment. In such fashion, the machine-learned model can perform one or more transformations on an input image based on user-desired values for the defined characteristics of the transformation(s). Stated differently, a user can be provided with continuous fine-grained control of specific, interpretable characteristics of an image that is transformed.

More particularly, existing image transformation models generally fail to offer users control over desired values for characteristics of an image transformation. As an example, methods such as Pix2Pix offer binary image transformation (e.g., a full transformation or no transformation), but fail to provide more fine-grained control over characteristics of the transformation (e.g., degree of transformation, etc.) (See Phillip Isola, Jun-Yan Zhu, Tinghui Zhou, Alexei A. Efros, *Image-to-Image Translation with Conditional Adversarial Networks*, Proceedings of the IEEE conference on computer vision and pattern recognition, pages 1125-1134 (2017)). Further, methods such as Pix2Pix necessitate the use of paired training data (e.g., paired training data with a known ground truth correspondence) (See Isola et al. above).

In response to these problems, the present disclosure proposes a machine-learned adversarial training approach in conjunction with the use of user-specified conditioning vectors to provide parameterized image transformations without the need for paired training data. More specifically, in one example, the disclosure proposes an adversarial network (e.g., a generative adversarial network, etc.) utilizing one or more machine-learned generator models and one or more machine-learned discriminator models. The one or more machine-learned generator models can be configured to receive an input image and a user specified conditioning vector. The user specified conditioning vector can parameterize one or more desired values for one or more defined characteristics of an output image. The machine-learned generator model can be configured to perform, based at least in part on the user-specified conditioning vector, one or more transformations on the input image to generate the output image with the desired values for the defined characteristics.

The one or more machine-learned discriminator models can be configured to receive the output image, a target image, and the user specified conditioning vector. The discriminator model(s) can be further configured to generate a discriminator output that selects one of the output image and the target image as having the one or more desired values for the one or more defined characteristics. At least one of the machine-learned generator model(s) can be trained based at least in part on the discriminator output. Thus, in such fashion, the machine-learned generator model(s) can be trained to apply one or more transformations to the input image according to the desired values for the defined characteristics(s) of the output image.

More particularly, one or more machine-learned generator models can be configured to receive an input image and a user-specified conditioning vector. The user-specified conditioning vector can parameterize one or more desired values for one or more defined characteristics of an output image. In some implementations, the user-specified conditioning vector can be a real and continuously valued vector. As an example, the vector can include values (e.g., parameterized user-desired values) that are both real and continuous (e.g., 0.5, 1, 0.2235, −5, etc.), the values corresponding to one or more desired characteristics of the output image.

In some implementations, the user-specified conditioning vector can describe a degree to which the one or more transformations are applied to the input image. As an example, the user-specified conditioning vector can include parameterized user-desired values (e.g., 1, 0, 0.5, etc.) that describe one or more transformations to perform and the desired degree to which the transformation(s) (e.g., transforming day-time lighting characteristics to night-time lighting characteristics, etc.) should be performed. For example, the conditioning vector can describe a nighttime to daytime transformation that is to be applied at a value of 0.5, resulting in a partially transformed output image. As another example, the conditioning vector can describe a summer to winter transformation to be applied at a value of 1.0, resulting in a fully transformed output image.

The one or more machine-learned generator models can be configured to perform, based at least in part on the user-specified conditioning vector, one or more transformations on the input image to generate the output image with the one or more desired values for the one or more defined characteristics. The user-specified conditioning vector can specify the transformation(s) to be performed on the input image. As an example, the user-specified conditioning vector can specify a summer-to-winter transformation (e.g., transforming the environment depicted in the input image from a summer environment to a winter environment) to perform to the input image. As another example, the user-specified conditioning vector can specify a summer-to-winter transformation and a day-to-night transformation (e.g., transforming the time of day depicted in the input image from daytime lighting characteristics to nighttime lighting characteristics). The user-specified conditioning vector can describe a plurality of transformations and a plurality of defined characteristics associated with each respective transformation.

In some implementations, the user-specified conditioning vector can specify one or more areas of the input image to which the one or more transformations are applied. As an example, the user-specified conditioning vector can include value(s) that specify that the transformation(s) should be applied to a top half of the input image. As another example, the user-specified conditioning vector can include value(s) that specify that the transformation should be applied to a bottom left portion of the input image. It should be noted that the user-specified conditioning vector can be multi-dimensional and can therefore specify one or more areas of the input image in one or more dimensions. As an example, the user-specified conditioning vector can, in some implementations, describe a transformation that applies a light source to an image. The user-specified conditioning vector can further specify the location of the light source in three dimensions (e.g., an x coordinate, a y coordinate, a z coordinate, etc.).

The defined characteristics of the output image can describe one or more feature(s), style(s), content(s), or any other aspect(s) of the output image. In some implementations, the defined characteristics can include a style characteristic that describes one or more stylistic transformation(s) to perform on the input image. As an example, a digital image generated by a digital camera can be transformed to a painting (e.g., an image to painting transformation). The machine-learned generator model can be trained so that the style transformation can replicate various styles of known artists (e.g., Monet, Van Gogh, Picasso, etc.). For example, a digital input image generated by a digital camera can be transformed to an output image that replicates the style of Picasso. It should be noted that the aforementioned style transformation can also be performed by the machine-learned generator model in reverse (e.g., transforming a Picasso painting to a "digital image" style). Both of the aforementioned style transformations can be applied to the input image to a certain degree. For example, an image to painting transformation can be applied to an input image with a desired value of 0.5, which can produce an output image that is partially transformed to a painting style. The style characteristic can describe any sort of subjective and/or objective transformation to apply to the image (e.g., painting style, drawing style, animation style, camera focal length/focal point, etc.).

In some implementations, the defined characteristics can include light characteristics and/or light source location characteristics. As an example, a digital image depicting a human face can be transformed so that a light source is present in the image projecting light at a certain intensity. As mentioned previously, the light source can be placed three-dimensionally during the transformation. For example, the desired values for the light source may place the light source behind the human face at an intensity of 0.2. For another example, the desired values for the light source may place the light source in front and to the right of the human face at an intensity of 0.8. In such fashion, the light source transformation can illuminate and/or darken various aspects of an input image in a three-dimensional manner. It should be noted that a plurality of light sources can be included in the light source transformation based on the desired values for the defined light source transformation characteristics.

In some implementations, the defined characteristics can include color characteristics. As an example, an input image lacking color (e.g., black and white, grayscale, etc.) can be transformed to an output image containing color (e.g., RGB image, CMYK image, etc.). In some implementations, the defined characteristics can include environmental characteristics. Environmental characteristics can include any sort of weather effect (e.g., rain, snow, hail, etc.), seasonal effect (summer, autumn, winter, spring, etc.), or any other sort of environmentally-related transformation (e.g., transforming a body of water to ice during the winter, etc.). As an example, an environmental transformation can add rain, snow, or other weather effects to an image. As another example, an environmental transformation can change the seasonal environment of an image from summer to winter (e.g., adding snowfall, changing the color of foliage and/or vegetation, freezing bodies of water, changing the angle and intensity of sunlight and/or shadows, etc.).

In some implementations, the environmental characteristic(s) of the output image can include a time of day. More particularly, the environmental characteristic(s) can determine the lighting of the environment depicted in an output image. As an example, an input image taken in an outdoor environment at 2:00 pm (e.g., with day-time lighting conditions) can be transformed to an output image of the same outdoor environment taken at 10:00 pm (e.g., with nighttime lighting conditions). In such fashion, the environmental characteristics can transform a "daytime" image to a "nighttime" image and vice-versa. It should be noted that the time of day can be transformed in conjunction with other environmental characteristics of the output image. As an example, a summer daytime image can be transformed to a winter nighttime image. As another example, a winter image without rain can be transformed to a summer image that depicts rainfall.

In some implementations, the defined characteristics of the output image can include feature characteristics. Feature characteristics can include features (e.g., objects, people, environments, organisms, text, etc.) depicted in the input and/or output image. As an example, an input image may depict a horse in a rural environment. The feature characteristics of the output image may include the coloring of the horse. In such fashion, the coloring of the horse can be changed, for example, to the coloring of a zebra, or any other sort of coloring pattern. As another example, an input image may depict a vehicle (e.g., an automobile, helicopter, etc.) in the background. The feature characteristics of the output image can include changing the color of the vehicle (e.g., red to blue), the type of vehicle (e.g., changing the vehicle from a first type of automobile to a second type of automobile), or removing the vehicle. The feature characteristics of the output image can include any aspect of any feature of the output image.

In some implementations, the one or more machine-learned generator models can include an encoder portion and a decoder portion. The user-specified conditioning vector can be provided to the decoder portion of the one or more machine-learned generator models. More particularly, a series of layers in the encoder portion (e.g., convolutional layers in a convolutional neural network) can encode the input image into a compressed representation that can be used as inputs to a series of residual blocks (e.g., residual blocks of a residual neural network(s)). A stack of connected layers can learn to transform the raw values of the user-specified conditioning vector to an alternative representation. At the lowest layer of the machine-learned generator model(s) (e.g., the bottleneck layer), the image representation and the alternative representation of the user-specified conditioning vector can be mixed by concatenation to one or more areas along the feature dimension of the image. A series of convolutional layers can decode the combined (e.g., concatenated) data into an output image.

The one or more machine-learned generator models can be or otherwise include one or more neural networks (e.g., deep neural networks) or the like. Neural networks (e.g., deep neural networks) can be feed-forward neural networks, convolutional neural networks, residual neural networks, and/or various other types of neural networks. In some implementations, the one or more machine-learned generator models can be residual neural networks including connections (e.g., skip connections) between individual layers of the residual neural networks. The connections between layers can be utilized to send the user-specified conditioning vector to a matching layer (e.g., a mirrored layer) of the network before the user-specified conditioning vector is reduced to a lowest alternative representation. In such fashion, a training signal (e.g., an optimization function) can be more effectively backpropagated through the machine-learned generator models.

The machine-learned discriminator model can be configured to receive the output image, a target image, and the user-specified conditioning vector. A target image can be an image from a set of target images representative of the desired output image. As an example, if an output image has been transformed to include defined style characteristics of a Picasso painting, the target image can be an image from a set of Picasso paintings. As another example, if an output image has been transformed to include defined environmental characteristic of a winter environment, the target image may be an image from a set of images depicting a winter environment.

The one or more machine-learned discriminator models can be configured to generate a discriminator output that selects one of the output image and the target image as having the one or more desired values for the one or more defined characteristics. The machine-learned discriminator model(s) can account for the inclusion of the user-specified conditioning vector in the transformation. More particularly, the machine-learned discriminator model(s) can, based at least in part on the user-specified conditioning vector, select one of the output image and the target image based on the defined characteristics of the output image.

In some implementations, the one or more machine-learned discriminator models can contain a plurality of layers configured to evaluate different aspects of the discriminator output. As an example, an initial layer (e.g., a convolutional layer of a convolutional neural network) of the discriminator model(s) can operate solely on the output image to extract a suitable deep representation (e.g., a latent space representation of the output image). The machine-learned discriminator model(s) can transform the user-specified conditioning vector through a series of fully connected layers (e.g., convolutional layers of a convolutional neural network) in a similar fashion to the machine-learned generator model(s). The learned representations of the input image and of the user-specified conditioning vector can be mixed by concatenation to spatial location(s) along the feature dimension in a manner similar to the machine-learned generator model(s). A series of layers (e.g., convolutional layers of a convolutional neural network) can operate on the concatenated representation to produce a classification score for the patch(es) of the output image. The selection output can be obtained by analyzing the patch(es) of the output image (e.g., performing a mean average pooling operation(s), etc.).

The one or more machine-learned generator models can be trained based at least in part on the discriminator output using various training or learning techniques, such as, for example, backwards propagation of errors (e.g., truncated backpropagation through time). In some implementations, the machine-learned discriminator model(s) and machine-learned generator model(s) can be trained in an adversarial fashion (e.g., a generative adversarial network). The specific training signal(s) used to train or retrain the machine-learned models and the methods utilized to do so will be discussed in-depth in the following figures.

The one or more machine-learned discriminator models can be or otherwise include one or more neural networks (e.g., deep neural networks) or the like. Neural networks (e.g., deep neural networks) can be feed-forward neural networks, convolutional neural networks, residual neural networks, and/or various other types of neural networks. In some implementations, the machine-learned discriminator model(s) and machine-learned generator model(s) can be components of a generative adversarial network (GAN). In some implementations, the one or more machine-learned discriminator models can be residual neural networks including connections (e.g., skip connections) between individual layers of the residual neural networks. The user-specified conditioning vector can be sent through the connections between layers from a first layer to a matching layer (e.g., a mirrored layer) of the network before the user-specified conditioning vector is transformed to an alternative representation. Alternatively, or additionally, in some embodiments, the user-specified conditioning vector can be input at other points of the network architecture. As an example, the user-specified conditioning vector can be input to the same layer as the input image. As another example, the user-specified conditioning vector can be concatenated to the output of some other layer(s) (e.g., after the transformation(s) have been applied to the image, etc.). In such fashion, a training signal (e.g., an optimization function) can be more effectively backpropagated through the machine-learned discriminator model(s).

In some implementations, the machine-learned generator model(s) can be further configured to receive the output image and the user-specified conditioning vector. Based at least in part on the output image and the conditioning vector, the one or more machine-learned generator models can perform one or more reconstructive transformations on the output image to generate a reconstructed input image. The one or more reconstructive transformations can be configured to remove the one or more transformations applied to the input image. As an example, an output image may include environmental characteristics that were transformed (e.g., winter to summer, rain to snow, etc.). The machine-learned generator model(s) can perform one or more reconstructive transformations on the output image to remove the one or more transformations (e.g., performing a winter-to-summer transformation to remove a previous summer-to-winter transformation, etc.).

In some implementations, the one or more machine-learned discriminator models can be further configured to receive the input image, the reconstructed input image, and the user-specified conditioning vector. The machine-learned discriminator model(s) can generate a reconstructive discriminator output that selects one of the reconstructed input image and the input image. The one or more generator models can be further trained based at least in part on the reconstructive discriminator output. In such fashion, the machine-learned generator model(s) can be trained to enforce cyclic consistency and therefore enhance the generative abilities of the machine-learned generator model(s). The generation of reconstructive discriminator output(s) and associated training usage will be discussed in greater detail with reference to the figures.

The present disclosure provides a number of technical effects and benefits. As one example technical effect and benefit, the systems and methods of the present disclosure enable a significant advancement in image transformation techniques compared to other approaches. While other methods known in the art are generally limited to binary image transformations (e.g., full day-time lighting, full night-time lighting, etc.), the present disclosure allows transformations to be applied to an input image to a certain degree that is specified by a user. This functionality provides users significant control over the application of transformations. As an example, a user can apply a day-to-night transformation to a lesser degree to reproduce the lighting characteristics of a sunset. As another example, a user can apply a summer-to-winter transformation to a lesser degree to reproduce the environmental characteristics of an early winter.

As another technical effect and benefit, the generalized machine-learned generator model(s) of the present disclosure allow for training without specifically paired training data. More particularly, the model(s) of the present disclosure can be trained using training images with labels that only determine a set identity (e.g., a set of images depicting various winter environments). Other models known in the art necessitate the use of paired training data (e.g., an image of an environment taken in the summer and a paired image of the same environment taken in the winter). Paired training data for the transformations performed by the model(s) of this disclosure can prove almost impossible to gather (e.g., a winter to summer transformation would necessitate waiting for seasonal changes to gather paired training data, etc.). Thus, the proposed model(s) can eliminate the requirement to spend significant time and resources gathering paired training data to train generator model(s).

As another example technical effect and benefit, the systems and methods of the present disclosure allow for generalized machine-learned generator model(s), which in turn allow for the application of multiple transformations to an input image. Other approaches known in the art can generally only be trained to apply one transformation to an input image, or can only be performed in an unintuitive fashion. However, the present disclosure enables machine-learned generator model(s) to be trained to apply a plurality of transformations to an input image. As an example, a model can be trained to transform an input image from day-time lighting characteristics and summer environmental characteristics to night-time lighting characteristics and winter environmental characteristics. In such fashion, the model can be trained to provide more realistic and complete image transformations compared to other methods known in the art. Further, the capability to perform multiple transformations with one model reduces the number of machine-learned models required, therefore reducing computing resource usage (e.g., processor usage, memory usage, etc.) associated with training multiple models.

With reference now to the Figures, example embodiments of the present disclosure will be discussed in further detail.

Example Devices and Systems

FIG. 1 depicts a block diagram of an example computing system 100 according to example embodiments of the present disclosure. The system 100 includes a user computing device 102, a server computing system 130, and an image transformation computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned model(s) 120. For example, the machine-learned model(s) 120 can be or can otherwise include various machine-learned models such feed-forward neural networks, recurrent neural networks (e.g., long short-term memory recurrent neural networks), convolutional neural networks, residual neural networks, or other forms of neural networks.

In some implementations, the machine-learned model(s) 120 can be received from the server computing system 130 over network 180, stored in the user computing device memory 114, and then used or otherwise implemented by the one or more processors 112. In some implementations, the user computing device 102 can implement multiple parallel instances of a single neural network 120

Additionally or alternatively, machine-learned model(s) 140 can be included in or otherwise stored and implemented by the server computing system 130 that communicates with the user computing device 102 according to a client-server relationship. For example, the machine-learned model(s) 140 can be implemented by the server computing system 140 as a portion of a web service. Thus, machine-learned model(s) 120 can be stored and implemented at the user computing device 102 and/or one or more networks 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input. The user input can be used, in some implementations, to specify one or more desired values for a user-specified conditioning vector, which will be discussed in greater detail with reference to FIGS. 3 and 4.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include machine-learned model(s) 140. For example, the machine-learned model(s) 140 can be or can otherwise include feed forward neural networks, deep neural networks, recurrent neural networks, residual neural networks, and convolutional neural networks.

The user computing device 102 and/or the server computing system 130 can train and/or evaluate the machine-learned model(s) 120 and/or 140 via interaction with the image transformation computing system 150 that is communicatively coupled over the network 180. The image transformation computing system 150 can be separate from the server computing system 130 or can be a portion of the server computing system 130.

The image transformation computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the image transformation computing system 150 to perform operations. In some implementations, the image transformation computing system 150 includes or is otherwise implemented by one or more server computing devices.

The image transformation computing system 150 can include a model trainer 160 that trains and/or evaluates the machine-learned model(s) 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned model(s) 120 and/or 140 based on a set of training data 162. The training data 162 can be, but is not limited to, unpaired training data (e.g., sets of images sharing one or more defined characteristics, such as depicting a winter environment at night).

The image transformation computing system 150 can also include image transforming model(s) 159. In some implementations, the image transforming model(s) 159 can include machine-learned generator model(s) and machine-learned discriminator model(s) configured to perform image transformations on an image based on a user-specified conditioning vector. In some implementations, the machine-learned generator model(s) and the machine-learned discriminator model(s) of the image transforming model(s) 159 can be trained by the model trainer 160 in an adversarial fashion (e.g., as a generative adversarial network (GAN), etc.). The image transformation computing system 150 can also optionally be communicatively coupled with various other devices (e.g., the user computing device 102) to provide trained image transformation model(s) (e.g., machine-learned generator models, machine-learned discriminator model(s), etc.) to the various other devices and/or to receive data from various other devices (e.g., receiving an image from the user computing device 102 as an input to the image transformation model(s) 159, sending the transformed image to the computing device 102, etc.).

Each of the model trainer 160 and the image transformation model(s) 159 can include computer logic utilized to provide desired functionality. Each of the model trainer 160 and the image transformation model(s) 159 can be implemented in hardware, firmware, and/or software controlling a general purpose processor. For example, in some implementations, each of the model trainer 160 and the image transformation model(s) 159 can include program files stored on a storage device, loaded into a memory and executed by one or more processors. In other implementations, each of the model trainer 160 and the network searcher 159 can include one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the user computing device 102 can include the model trainer 160 and the training dataset 162. In such implementations, the networks 120 can be both trained and used locally at the user computing device 102. In some of such implementations, the user computing device 102 can implement the model trainer 160 to personalize the networks 120 based on user-specific data.

Further, although the present disclosure is described with particular reference to neural networks. The systems and methods described herein can be applied to other multi-layer machine-learned model architectures.

Figure 2:
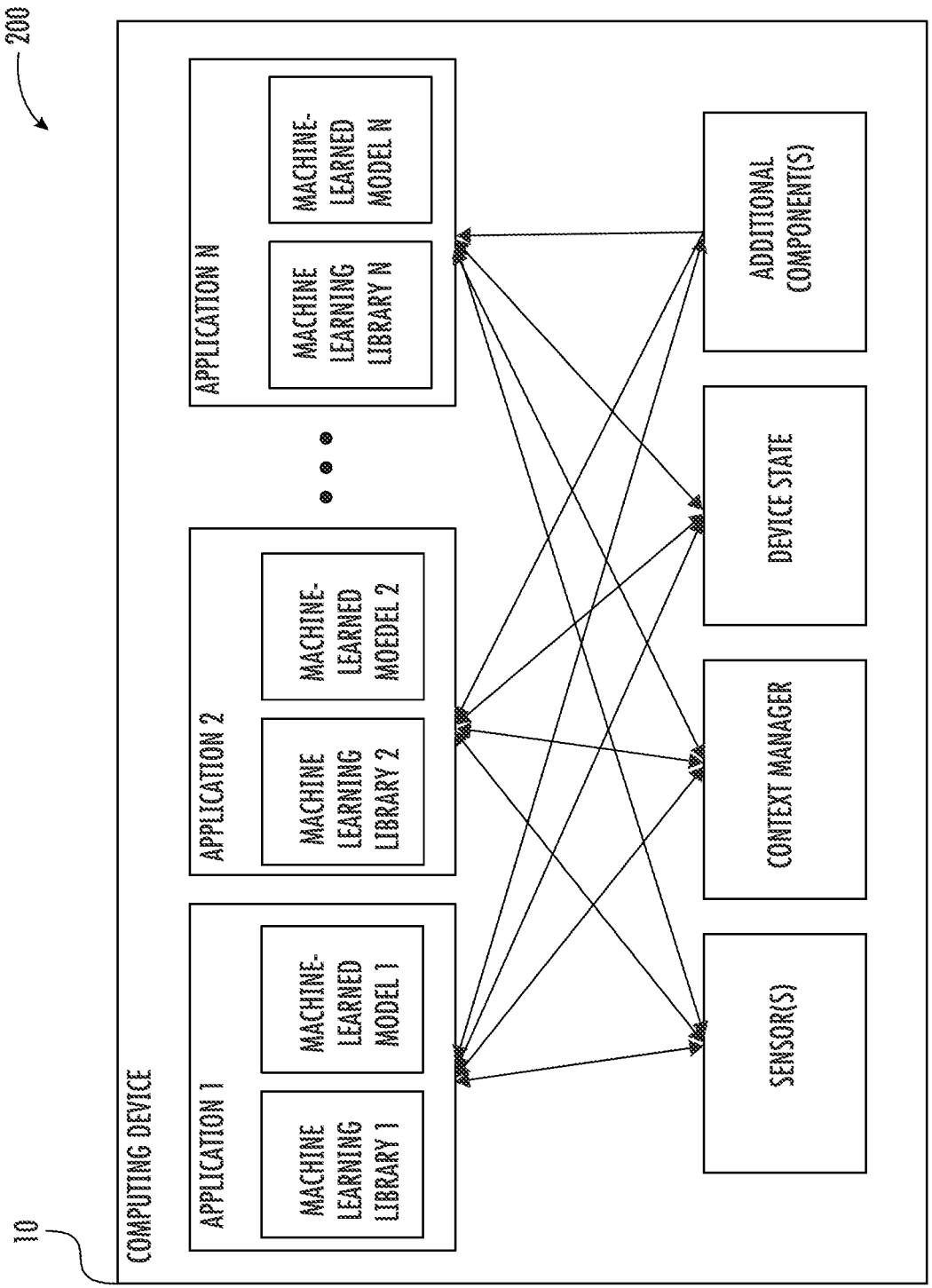
FIG. 2 depicts a block diagram of an example computing device according to example embodiments of the present disclosure.

FIG. 2 depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include machine-learned generator model(s) and/or machine-learned discriminator model(s). Example applications include a text messaging application, an email application, a dictation application, a virtual keyboard application, a browser application, an image capture application, an image transformation application, an image upload application, etc.

As illustrated in FIG. 2, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 3:
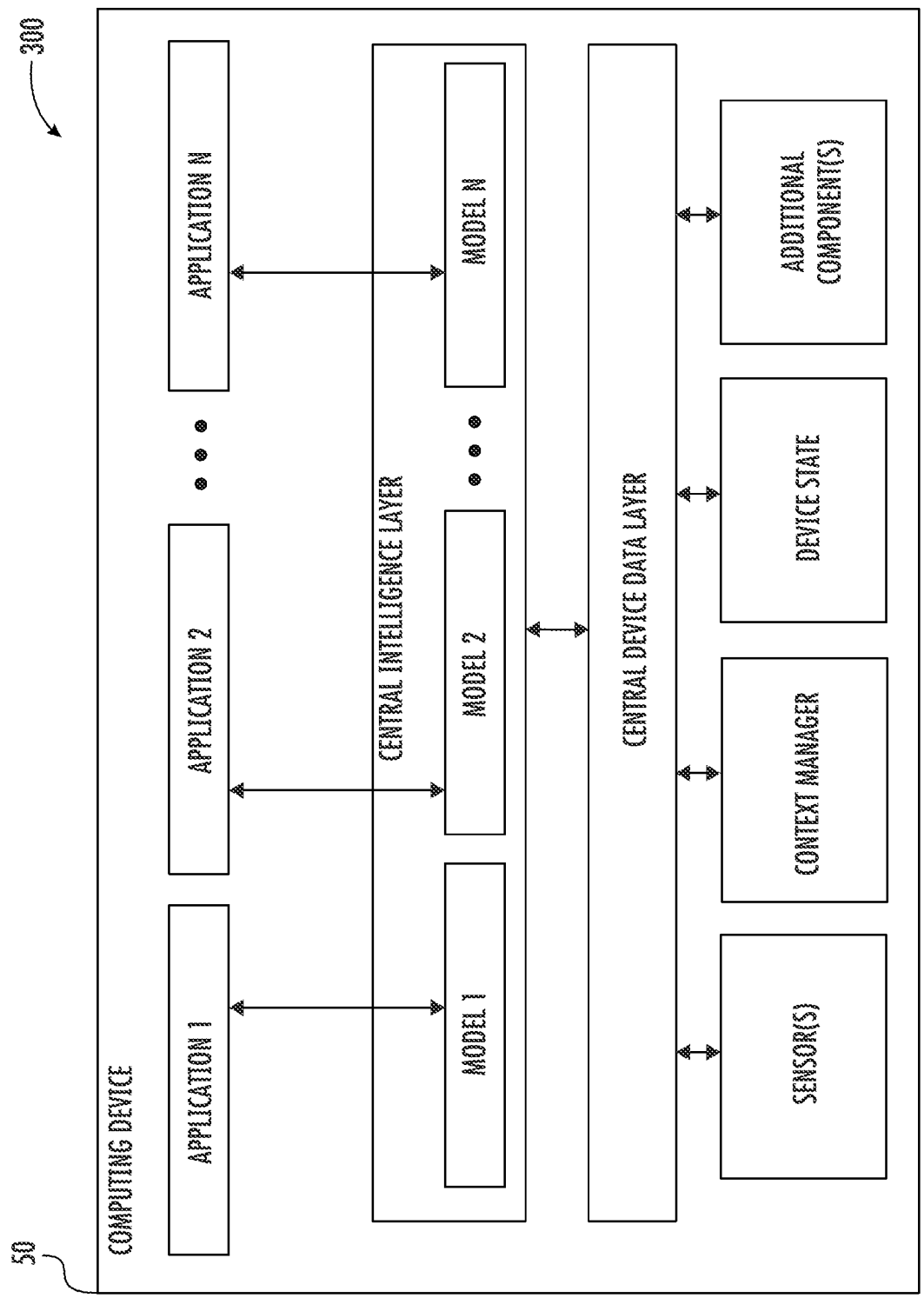
FIG. 3 depicts a block diagram of an example computing device according to example embodiments of the present disclosure.

FIG. 3 depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, an image capture application, an image transformation application, an image upload application, etc. In some implementations, each application can communicate with the central intelligence layer (and model(s) stored therein) using an API (e.g., a common API across all applications).

The central intelligence layer includes a number of machine-learned models. For example, as illustrated in FIG. 3, a respective machine-learned model (e.g., a machine-learned generator model, a machine-learned discriminator model, etc.) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 3, the central device data layer can communicate with a number of other components of the computing device, such as, for example, one or more sensors, a context manager, a device state component, and/or additional components. In some implementations, the central device data layer can communicate with each device component using an API (e.g., a private API).

Example Training Environment and Methods

Figure 4:
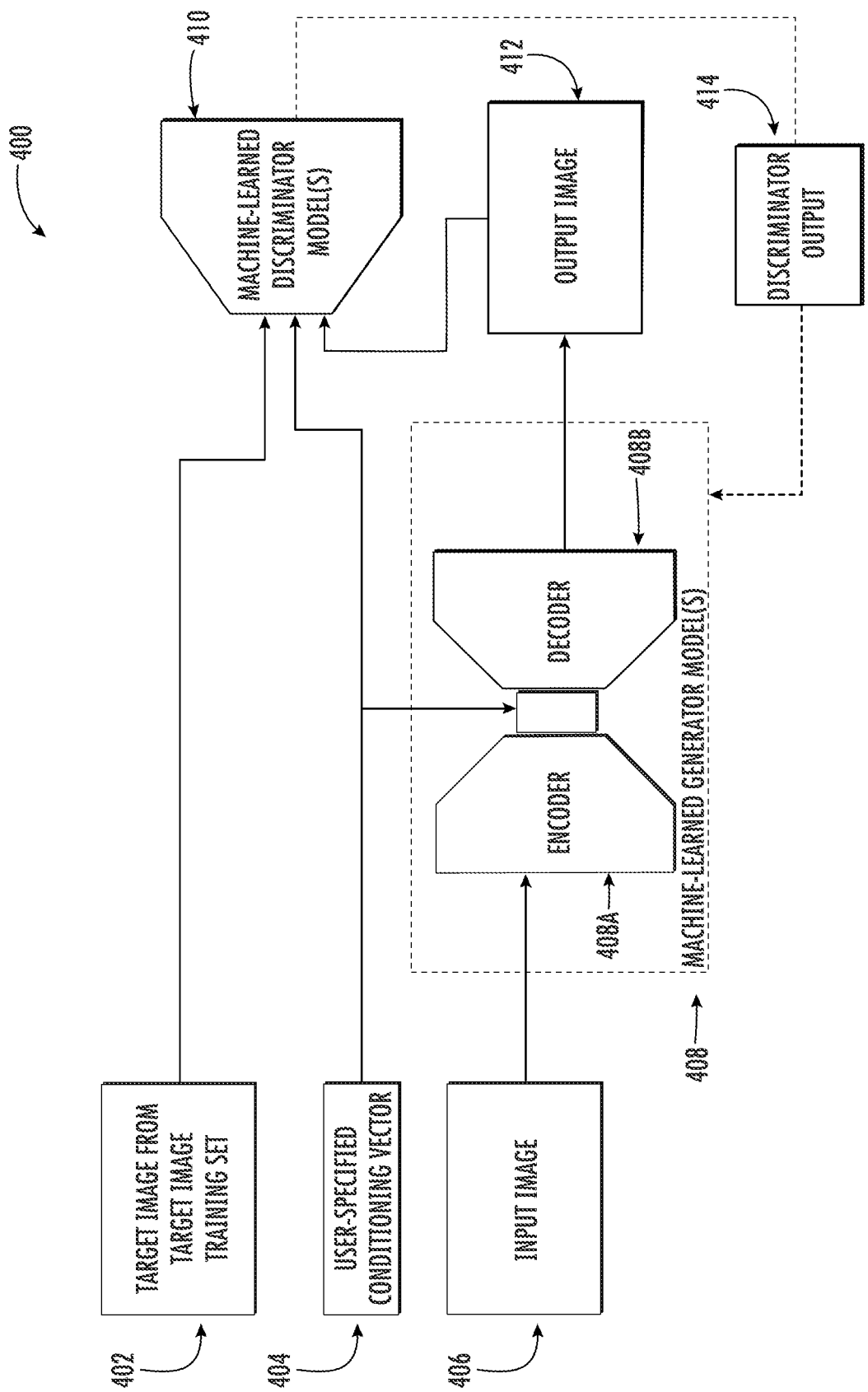
FIG. 4 depicts a graphical diagram of example machine-learned models for output image generation and associated training signals according to example embodiments of the present disclosure.

FIG. 4 depicts a graphical diagram of example machine-learned models for output image generation and associated training signals according to example embodiments of the present disclosure. An input image 406 and user-specified conditioning vector 404 can be received as an input by machine-learned generator model(s) 408. The input image 406 can be a digital image (e.g., a digital image captured by a digital image capture device, a scanned image, etc.). In some implementation, the input image 406 can be an output of machine-learned generator model(s), as will be discussed in greater detail with regards to FIG. 5. The user specified conditioning vector 404 can parameterize one or more desired values for one or more defined characteristics of an output image. In some implementations, the user-specified conditioning vector 404 can be a real and continuously valued vector. As an example, the vector can include values (e.g., parameterized user-desired values) that are both real and continuous (e.g., 0.5, 1, 0.2235, −5, etc.), the values corresponding to one or more desired characteristics of the output image.

In some implementations, the user-specified conditioning vector 404 can describe a degree to which the one or more transformations are applied to the input image. As an example, the user-specified conditioning vector 404 can include parameterized user-desired values (e.g., 1, 0, 0.5, etc.) that describe one or more transformations to perform and the desired degree to which the transformation(s) (e.g., transforming day-time lighting characteristics to night-time lighting characteristics, etc.) should be performed. For example, the conditioning vector 404 can describe a nighttime to daytime transformation that is to be applied at a value of 0.5, resulting in a partially transformed output image. As another example, the conditioning vector 404 can describe a summer to winter transformation to be applied at a value of 1.0, resulting in a fully transformed output image.

In some implementations, the user-specified conditioning vector 404 can specify one or more areas of the input image 406 to which the one or more transformations are applied.

As an example, the user-specified conditioning vector 404 can include value(s) that specify that the transformation(s) should be applied to a top half of the input image 406. As another example, the user-specified conditioning vector 404 can include value(s) that specify that the transformation should be applied to a bottom left portion of the input image 406. It should be noted that the user-specified conditioning vector 404 can be multi-dimensional and can therefore specify one or more areas of the input image 406 in one or more dimensions. As an example, the user-specified conditioning vector 404 can, in some implementations, describe a transformation that applies a light source to the input image 406, as will be discussed in greater detail with reference to FIG. 6B.

The machine-learned generator model(s) 408 can include an encoder portion 408A and a decoder portion 408B. The user-specified conditioning vector 404 can be provided to the decoder portion 408B of the one or more machine-learned generator models 408. More particularly, a series of layers in the encoder portion 408A (e.g., convolutional layers in a convolutional neural network) can encode the input image 406 into a compressed representation that can be used as inputs to a series of residual blocks (e.g., residual blocks of a residual neural network(s)). A stack of connected layers can learn to transform the raw values of the user-specified conditioning vector 404 to an alternative representation. At the lowest layer of the machine-learned generator model(s) 408 (e.g., the bottleneck layer), the image representation (e.g., the lower-dimensional representation of the input image 406) and the alternative representation of the user-specified conditioning vector 404 can be mixed by concatenation to one or more areas along the feature dimension of the input image 406. A series of convolutional layers can decode the combined (e.g., concatenated) data into an output image 412.

The one or more machine-learned generator models 408 can be or otherwise include one or more neural networks (e.g., deep neural networks) or the like. Neural networks (e.g., deep neural networks) can be feed-forward neural networks, convolutional neural networks, residual neural networks, and/or various other types of neural networks. In some implementations, the one or more machine-learned generator models 408 can be residual neural networks including connections (e.g., skip connections) between individual layers of the residual neural networks. The connections between layers can be utilized to send the user-specified conditioning vector to a matching layer (e.g., a mirrored layer) of the network before the user-specified conditioning vector is reduced to a lowest alternative representation. In such fashion, a training signal (e.g., a discriminator output 414) can be more effectively backpropagated through the machine-learned generator model(s).

The machine-learned generator model(s) 408 can be configured to perform, based at least in part on the user-specified conditioning vector 404, one or more transformations on the input image 406 to generate an output image 412 with the one or more desired values for one or more defined characteristics of the output image 412. The user-specified conditioning vector 404 can specify the transformation(s) to be performed on the input image 406. As an example, the user-specified conditioning vector 404 can specify a summer-to-winter transformation (e.g., transforming the environment depicted in the input image from a summer environment to a winter environment) to apply to the input image 406. As another example, the user-specified conditioning vector 404 can specify a summer-to-winter transformation and a day-to-night transformation (e.g., transforming the time of day depicted in the input image from daytime lighting characteristics to nighttime lighting characteristics). The user-specified conditioning vector 404 can describe a plurality of transformations and a plurality of defined characteristics associated with each respective transformation.

The defined characteristics of the output image 412 can describe one or more feature(s), style(s), content(s), or any other aspect(s) of the output image 412. In some implementations, the defined characteristics can include a style characteristic that describes one or more stylistic transformation(s) to perform on the input image 406. As an example, an input image 406 (e.g., a digital image generated by a digital camera) can be transformed to a painting (e.g., an image to painting transformation). The machine-learned generator model(s) 408 can be trained so that the style transformation can replicate various styles of known artists (e.g., Monet, Van Gogh, Picasso, etc.). For example, a digital input image 406 generated by a digital camera can be transformed to an output image 412 that replicates the style of Picasso. It should be noted that the aforementioned style transformation can also be performed by the machine-learned generator model(s) 408 in reverse (e.g., transforming a Picasso painting to a "digital image" style), as will be discussed in greater detail with reference to FIG. 5. Both of the aforementioned style transformations can be applied to the input image 406 to a certain degree. For example, an image to painting transformation can be applied to an input image 406 with a desired value of 0.5, which can produce an output image 412 that is partially transformed to a painting style. The style characteristic can describe any sort of subjective and/or objective transformation to apply to the image (e.g., painting style, drawing style, animation style, camera focal length/focal point, etc.).

In some implementations, the defined characteristics can include light characteristics and/or light source location characteristics. As an example, a digital input image 406 depicting a human face can be transformed so that a light source is present in the image projecting light at a certain intensity. As will be discussed in greater detail with reference to FIG. 6B, the light source can be placed three-dimensionally during the transformation. For example, the desired values for the light source may place the light source behind the human face at an intensity of 0.2. For another example, the desired values for the light source may place the light source in front and to the right of the human face at an intensity of 0.8. In such fashion, the light source transformation can illuminate and/or darken various aspects of the input image 406 in a three-dimensional manner. It should be noted that a plurality of light sources can be included in the light source transformation based on the desired values for the defined light source transformation characteristics.

In some implementations, the defined characteristics can include color characteristics. As an example, an input image 406 lacking color (e.g., black and white, grayscale, etc.) can be transformed to an output image 412 containing color (e.g., RGB image, CMYK image, etc.). In some implementations, the defined characteristics can include environmental characteristics. Environmental characteristics can include any sort of weather effect (e.g., rain, snow, hail, etc.), seasonal effect (summer, autumn, winter, spring, etc.), or any other sort of environmentally-related transformation (e.g., transforming a body of water to ice during the winter, etc.). As an example, an environmental transformation can add rain, snow, or other weather effects to an output image 412. As another example, an environmental transformation can change the seasonal environment of an input image 406 from summer to winter (e.g., adding snowfall, changing the color of foliage and/or vegetation, freezing bodies of water, changing the angle and intensity of sunlight and/or shadows, etc.).

In some implementations, the environmental characteristic(s) of the output image 412 can include a time of day. More particularly, the environmental characteristic(s) can determine the lighting of the environment depicted in the output image 412. As an example, an input image 406 taken in an outdoor environment at 2:00 pm (e.g., with day-time lighting conditions) can be transformed to an output image 412 of the same outdoor environment taken at 10:00 pm (e.g., with night-time lighting conditions). In such fashion, the environmental characteristics can transform a "daytime" image to a "nighttime" image and vice-versa. It should be noted that the time of day can be transformed in conjunction with other environmental characteristics of the output image. As an example, a summer daytime image can be transformed to a winter nighttime image. As another example, a winter image without rain can be transformed to a summer image that depicts rainfall.

In some implementations, the defined characteristics of the output image 412 can include feature characteristics. Feature characteristics can include features (e.g., objects, people, environments, organisms, text, etc.) depicted in the input image 406 and/or the output image 412. As an example, an input image 406 may depict a horse in a rural environment. The feature characteristics of the output image 412 may include the coloring of the horse. In such fashion, the coloring of the horse can be changed, for example, to the coloring of a zebra, or any other sort of coloring pattern. As another example, an input image 406 may depict a vehicle (e.g., an automobile, helicopter, etc.) in the background. The feature characteristics of the output image 412 can include changing the color of the vehicle (e.g., red to blue), the type of vehicle (e.g., changing the vehicle from a first type of automobile to a second type of automobile), or removing the vehicle. The feature characteristics of the output image 412 can include any aspect of any feature of the output image 412.

The machine-learned discriminator model 410 can be configured to receive the output image 412, a target image from target image set 402, and the user-specified conditioning vector 404. A target image 402 can be an image from a set of target images representative of the desired output image 412. As an example, if the output image 412 has been transformed to include defined style characteristics of a Picasso painting, the target image 402 can be an image from a set of Picasso paintings. As another example, if an output image 412 has been transformed to include defined environmental characteristics of a winter environment, the target image 402 may be an image from a set of images depicting a winter environment.

The machine-learned discriminator model(s) 410 can be configured to generate a discriminator output 414 that selects one of the output image 412 and the target image 402 as having the one or more desired values for the one or more defined characteristics. The machine-learned discriminator model(s) 410 can account for the inclusion of the user-specified conditioning vector 404 in the transformation. More particularly, the machine-learned discriminator model(s) 410 can, based at least in part on the user-specified conditioning vector 404, select one of the output image 412 and the target image 402 based on the defined characteristics of the output image 412.

The one or more machine-learned discriminator models 410 can contain a plurality of layers configured to evaluate different aspects of the discriminator output 414. As an example, an initial layer (e.g., a convolutional layer of a convolutional neural network) of the machine-learned discriminator model(s) 410 can operate solely on the output image 412 to extract a suitable deep representation (e.g., a latent space representation of the output image 412). The machine-learned discriminator model(s) 410 can transform the user-specified conditioning vector 404 through a series of fully connected layers (e.g., convolutional layers of a convolutional neural network) in a similar fashion to the machine-learned generator model(s) 408. The learned representations of the input image 406 and of the user-specified conditioning vector 404 can be mixed by concatenation to spatial location(s) along of the feature dimension in a manner similar to the machine-learned generator model(s) 408. A series of layers (e.g., convolutional layers of a convolutional neural network) can operate on the concatenated representation to produce a classification score for the patch(es) of the output image 412. The selection output (e.g., the discriminator output 414) can be obtained by analyzing patch(es) of the output image 412 (e.g., performing a mean average pooling operation(s), etc.).

The one or more machine-learned discriminator models 410 can be or otherwise include one or more neural networks (e.g., deep neural networks) or the like. Neural networks (e.g., deep neural networks) can be feed-forward neural networks, convolutional neural networks, residual neural networks, and/or various other types of neural networks. In some implementations, the machine-learned discriminator model(s) 410 and machine-learned generator model(s) 408 can be components of a generative adversarial network (GAN). In some implementations, the one or more machine-learned discriminator models 410 can be residual neural networks including connections (e.g., skip connections) between individual layers of the residual neural networks. The user-specified conditioning vector 404 can be sent through the connections between layers from a first layer to a matching layer (e.g., a mirrored layer) of the network before the user-specified conditioning vector 404 is reduced to a lowest alternative representation. In such fashion, a training signal (e.g., the discriminator output 414) can be evaluated with an objective function and more effectively backpropagated through the machine-learned discriminator model(s) 410. As an example, the machine-learned discriminator model(s) 410 can be trained on a difference between a ground truth associated with the discriminator output 414 (e.g., a defined transformation quality of the output image 412) and the discriminator output 414 from the machine-learned discriminator model(s) 410.

The one or more machine-learned generator models 408 can be trained based at least in part on an objective function evaluation of the discriminator output 414 using various training or learning techniques, such as, for example, backwards propagation of errors (e.g., truncated backpropagation through time). In some implementations, the machine-learned discriminator model(s) 410 and machine-learned generator model(s) 414 can be trained in an adversarial fashion (e.g., a generative adversarial network). As one example, in some implementations, training the machine-learned generator model(s) based on the discriminator output 414 can include performing stochastic gradient descent to optimize an objective function that evaluates the discriminator output 414 (e.g., minimize the discriminator output 414, etc.). In such fashion, the machine-learned discriminator model(s) 410 can be trained to optimize the value of the discriminator output 414 while the machine-learned generator model(s) can be trained to minimize the value of the discriminator output 414 (e.g., in an adversarial fashion).

Figure 5:
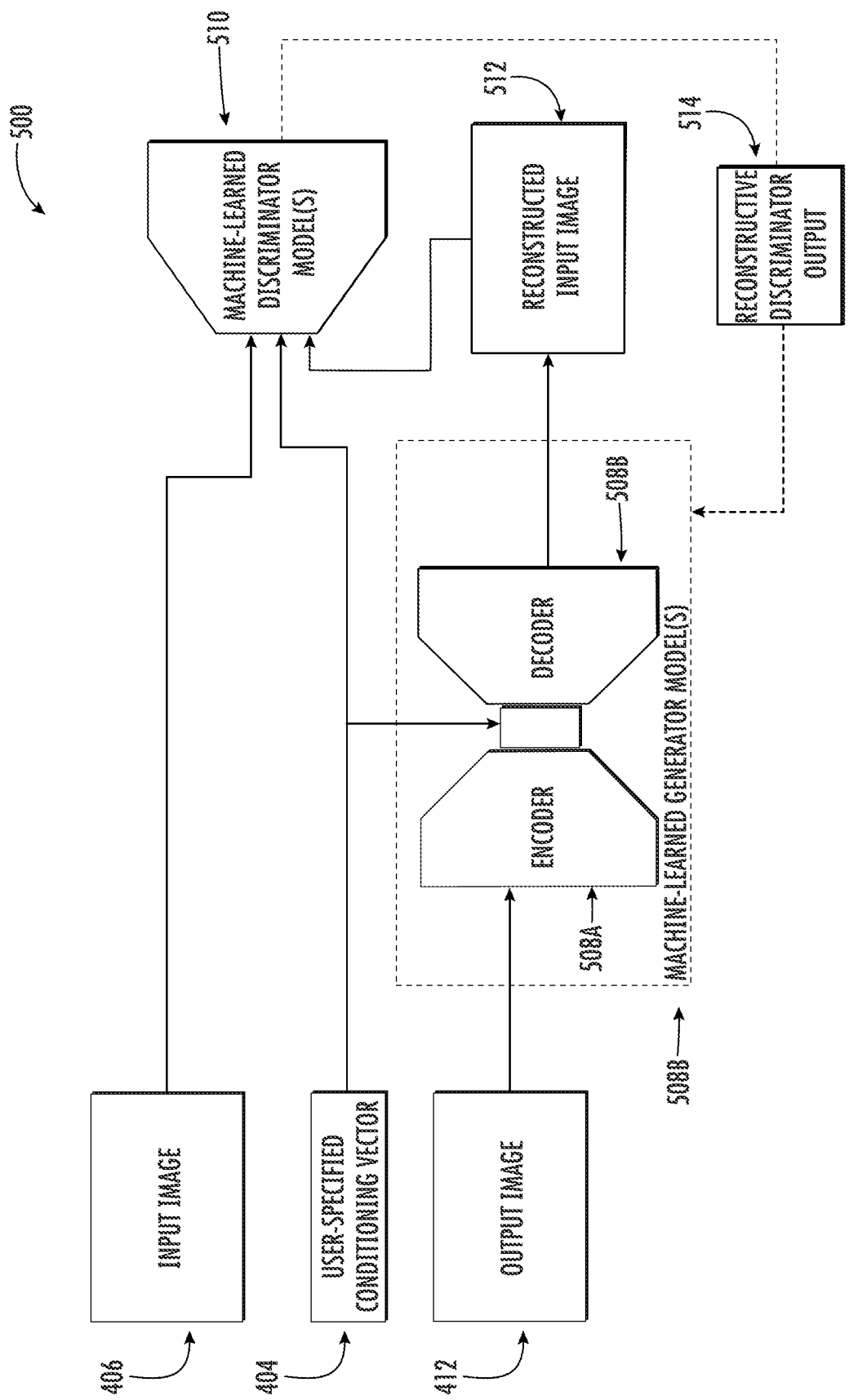
FIG. 5 depicts a graphical diagram of example machine-learned models for reconstructive input image generation and associated training signals according to example embodiments of the present disclosure.

FIG. 5 depicts a graphical diagram of example machine-learned models for reconstructive input image generation and associated training signals according to example embodiments of the present disclosure. In some implementations, as depicted, machine-learned generator model(s) and machine-learned discriminator model(s) can be run in a mirrored configuration with respect to the model architecture depicted in FIG. 4. More particularly, machine-learned generator model(s) 508 and machine-learned discriminator model(s) 510 can be run in a parallel configuration to perform transformations on the output image 412 (e.g., the output image 412 generated by machine-learned generator model(s) 408).

The machine-learned generator model(s) 508 (e.g., including encoder portion 508A and decoder portion 508B) can receive output image 412 and user-specified conditioning vector 414 as inputs. The machine-learned generator model(s) 508 can produce a reconstructed output image 512 in the same fashion as machine-learned generator model(s) 408 of FIG. 4. The reconstructed input image 512 can be a reconstruction of the input image 406 from the output image 412. More specifically, by generating the reconstructed input image 512 based on the output image 412 and the user-specified conditioning vector 404, the machine-learned generator model(s) 508 can reverse the parameterized transformations specified by the vector and initially applied by machine-learned generator model(s) 408.

As an example, input image 406 can be an image depicting a summer environment with daytime lighting conditions. The machine-learned generator model(s) 408 of FIG. 4 can, based on the user specified conditioning vector 414 and the input image 406, generate an output image 412 depicting a winter environment with nighttime lighting conditions. The machine-learned generator model(s) 508 can receive the output image 412 and the user-specified conditioning vector 404 and generate, as an output, a reconstructed input image 512. The reconstructed input image 512 can depict a reconstruction of the depiction of the input image 406 (e.g., the summer environment with daytime lighting conditions). In such fashion, the machine-learned generator model(s) 508 can reconstruct the input image from the output image by applying a transformation that reverses the transformation applied by machine-learned generator model(s) 408.

The reconstructed input image 512 and the input image 406 can be received by the machine-learned discriminator model(s) 510 as inputs. The machine-learned discriminator model(s) 510 can evaluate a difference between the reconstructed input image 512 and the input image 406 to output a reconstructive discriminator output 514. The reconstructive discriminator output can be used as a training signal for an optimization function. The optimization function can evaluate the reconstructive discriminator output 414 and, based at least in part on the reconstructive discriminator output 414, modify values for one or more parameters of the machine-learned discriminator model(s) 510 and/or the machine-learned generator model(s) 508 based on the optimization function. More particularly, the output can be backpropagated through the machine-learned model(s) (e.g., 508 and 510) to determine values associated with one or more parameters of the model(s) to be updated. The one or more parameters can be updated to reduce the difference evaluated by the optimization function (e.g., using an optimization procedure, such as a gradient descent algorithm).

In some implementations, the reconstructive discriminator output 514 can be used as a training signal to the machine-learned generator model(s) 408 and machine-learned discriminator model(s) 410 of FIG. 4. Based at least in part on an optimization function that evaluates the reconstructive discriminator output 514, values for one or more parameters of the machine-learned discriminator model(s) 410 and/or the machine-learned generator model(s) can be modified 408. More particularly, the output can be back-propagated through the machine-learned model(s) to determine values associated with one or more parameters of the model(s) to be updated. The one or more parameters can be updated to reduce the difference evaluated by the optimization function (e.g., using an optimization procedure, such as a gradient descent algorithm).

In such fashion, the performance of the mirrored model architecture (e.g., model(s) 508 and 510) can be used as a training signal for the transformational model architecture (e.g., model(s) 408 and 410) to enforce consistency between transformations. More particularly, the addition of the mirrored model architecture can serve to enforce structure on the generated outputs of machine-learned generator model 408 to minimize deviation of the transformations.

In some implementations, the problem evaluated by the objective function can be formulated such that given an input image domain X (e.g., input image 406) and a target image domain Y (e.g., target image 402), a parametrizable transformation $G^P: X, P \rightarrow Y$ can be learned. For example, $G^P$ can denote the transformation performed by machine-learned generator model(s) 408, while $F^P$ can denote the transformation performed by machine-learned generator model(s) 508. As denoted by P, the model(s) are aware of (e.g., can take as an input) user-specified conditioning vector 404. More particularly, the transformation can be learned by means of the machine-learned generator model(s) 408 that generate a valid sample $y \in Y$ by taking as input an input image 406 $x \in X$ and a parametrization of the transformation to apply $p \in P$ (e.g., values of user-specified conditioning vector 404). The target image(s) 402 can be from set(s) of unpaired training samples. As an example, in a training scenario, the target image can be selected from a set of unpaired target images $\{y_j, p_j\}_{j=1}^N$ and an input image 406 can be selected from a set of unpaired input images $\{x_i\}_{i=1}^N$.

More particularly, in some implementations, two unpaired image domains X (e.g., input image(s) 406 and Y (e.g., target image(s) 402 from a set of training images) can be respectively mapped to the machine-learned discriminator model(s) 410 (e.g., $D_Y^P$) and the machine-learned discriminator model(s) 510 (e.g., $D_X^P$) leveraging an additional inverse mapping function $F: Y \rightarrow X$, denoting with x~(X) and y~(Y) the two data distributions. Desired values specified by the user can be parameterized into the user-specified conditioning vector 404. As an example, the user-specified conditioning vector 404 can be an n dimensional vector of floats denoted as $p \in P \subset R^n$. As discussed previously, machine-learned generator model(s) 410 (e.g., $G^P$) and machine-learned generator model(s) 510 (e.g., $F^P$) can be parameterization aware by taking the user-specified conditioning vector 404 (e.g., $p \in P \subset R^n$) as an input.

As an example, the objective function of the system (e.g., the combined architectures of FIG. 4 and FIG. 5) can be expressed as:

$$L_{gan}^P(G^P, D_Y^P, X, Y, P) = E_{(x,y,p) \sim (X,Y,P)} 1/2[(1 - D_Y^P(y,p))^2 + D_Y^P(G(x,p),p)^2]$$

$$L_{cyc}^P(G^P, F^P) = E_{(x,y,p) \sim (X,Y,P)} 1/2[\|F^P(G^P(x,p),p) - x\|_1 + \|G^P(F^P(y,p),p) - y\|_1]$$

$$L(G^P, F^P, D_X^P, D_Y^P) = L_{gan}^P(G^P, D_Y^P, X, Y, P) + L_{gan}^P(F^P, D_X^P, X, Y, P) + \lambda L_{cyc}^P(G^P, F^P)$$

wherein the machine-learned generator model(s) 410 (e.g., $G^P$) and machine-learned generator model(s) 510 (e.g., $F^P$) can be optimized to minimize the objective function L while the machine-learned discriminator model(s) (e.g., $D_X^P$ and $D_Y^P$) are optimized to maximize the objective function L. $L_{cyc}^P$ can serve as loss signal that measures the cyclic consistency between mirrored architectures (e.g., the model architecture depicted in FIG. 4 and the model architecture depicted in FIG. 5), while λ can represent a scalar value to weigh the contribution of the cyclic consistency $L_{cyc}^P$ in the overall objective function L. More particularly, the model architecture of FIG. 4 can be represented by the loss signal $L_{gan}^P(G^P, D_Y^P, X, Y, P)$, the model architecture of FIG. 5 can be represented by the loss signal $L_{gan}^P(F^P, D_X^P, X, Y, P)$, and the cyclic consistency between the models can be represented by $\lambda L_{cyc}^P(G^P, F^P)$.

Figure 6A:
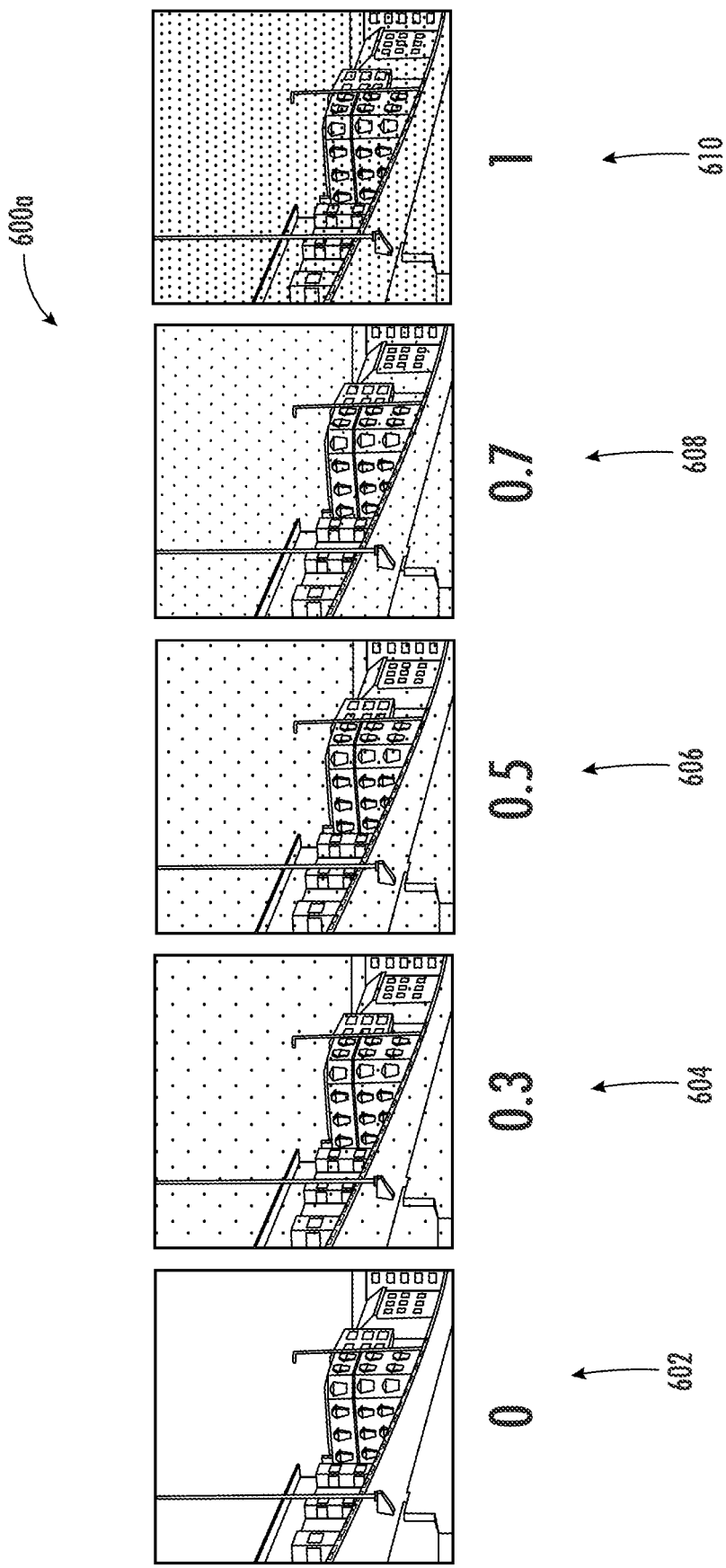
FIG. 6A depicts a graphical representation of an example day-to-night image transformation applied to a defined characteristic of an input image at different user-desired values according to example embodiments of the present disclosure.

FIG. 6A depicts a graphical representation of an example day-to-night image transformation applied to a defined characteristic of an input image at different user-desired values according to example embodiments of the present disclosure. 600A depicts an example transformation performed by the machine-learned generator model(s) of the present disclosure. As depicted, a machine-learned generator model(s) can receive a user-specified conditioning vector. The user-specified conditioning vector can include parameterized values the user desires for defined characteristics of the transformation(s) to be applied. In the present example, the user can specify a day-to-night transformation with a value of 0% for the input image. The transformation can be applied at a degree of 0% to the input image, resulting in image 602. The user-specified conditioning vector can continuously specify a greater value for the degree of the day-to-night transformation, leading to transformation at an increasingly greater degree in images 604, 606, 608, and 610.

For image 610, the user-specified conditioning vector specifies a 100% degree of transformation, leading an image depicting daylight lighting conditions to be fully transformed to an image depicting nighttime lighting conditions. As depicted, the user-specified conditioning vector can provide a user with fine-grained control over the degree of transformation applied to the input image (e.g., the various degrees of transformation applied to images 604, 606, and 608).

Figure 6B:
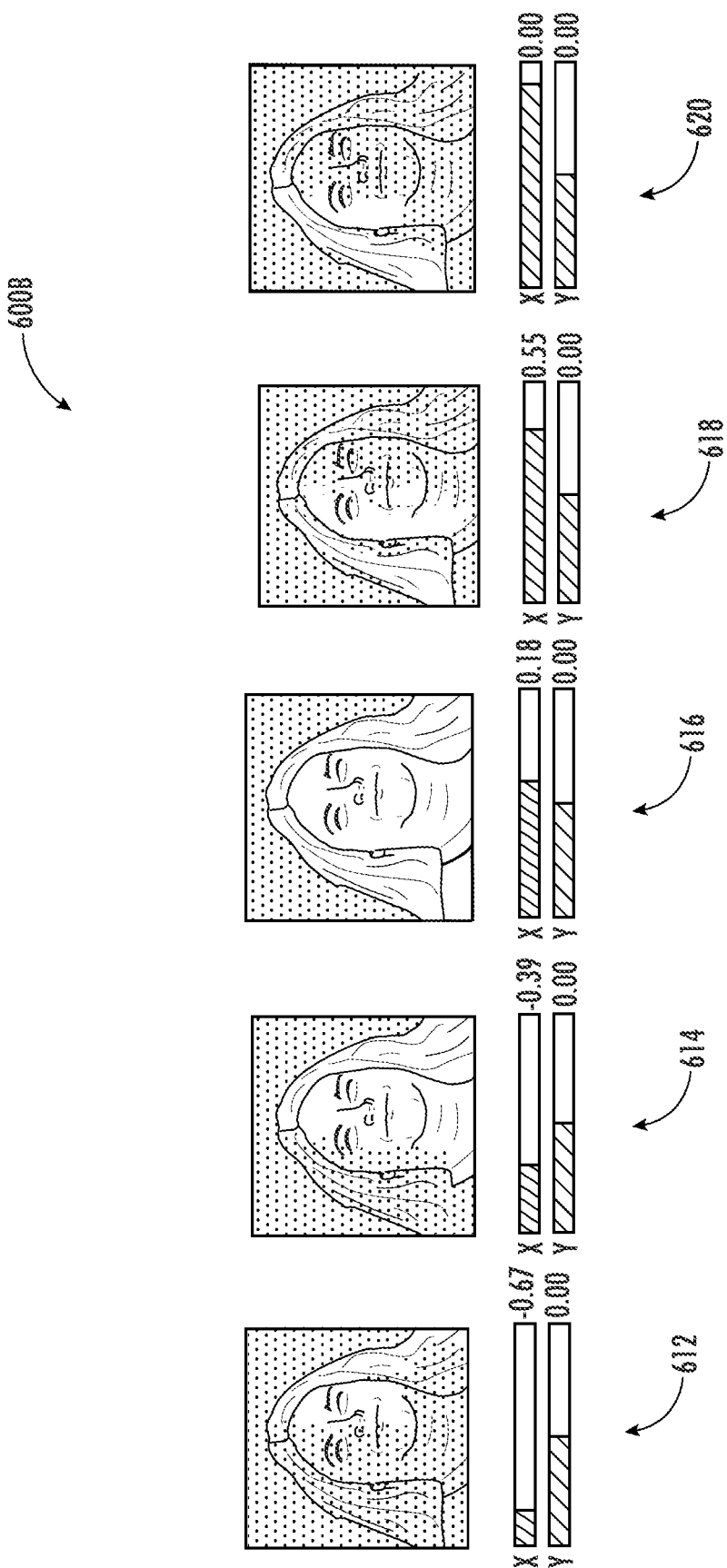
FIG. 6B depicts a graphical representation of an example light source image transformation applied to one or more defined characteristics of an input image at different user-desired values according to example embodiments of the present disclosure.
Figure 6C:
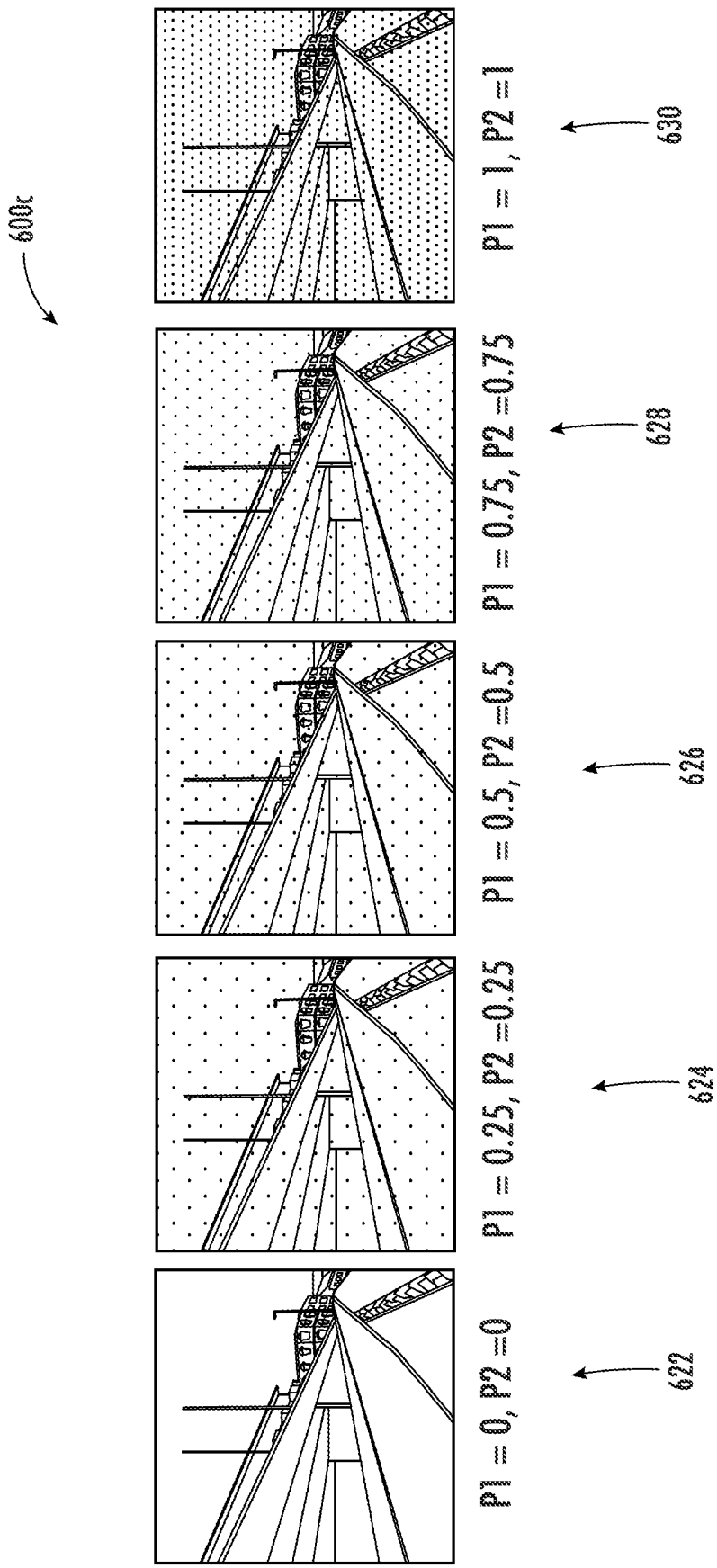
FIG. 6C depicts a graphical representation of an example day-to-night transformation and weather transformation applied simultaneously to defined characteristics of an input image at different user-desired values according to example embodiments of the present disclosure.

It should be noted that, in some implementations, a second transformation can be applied in addition to the day-to-night transformation depicted in FIG. 6A, as demonstrated in FIG. 6C. As an example, a summer-to-winter transformation can be applied in conjunction to the day-to-night transformation, the summer-to-winter transformation controlled by the user with the usage of additional parameterized values in the user-specified conditioning vector. For example, the user-specified conditioning vector can specify a 1.0 value for a day-to-night transformation (e.g., depicting full nighttime lighting conditions) and a 0.3 value for a summer-to-winter transformation (e.g., depicting light winter environmental conditions, such as a small amount of snow). In such fashion, the defined characteristics of the image (e.g., the degree of day or night, etc.) can be manipulated using parameterized values (e.g., real and continuous values, etc.) of defined characteristics of transformation(s) at a specificity sufficient to enable fine-grained control of the applied transformation by the user.

FIG. 6B depicts a graphical representation of an example light source image transformation applied to one or more defined characteristics of an input image at different user-desired values according to example embodiments of the present disclosure. 600B depicts an example transformation performed by the machine-learned generator model(s) of the present disclosure. As depicted, a machine-learned generator model(s) can receive a user-specified conditioning vector. The user-specified conditioning vector can include parameterized values the user desires for defined characteristics of the transformation(s) to be applied. In the present example, the user can specify a light source transformation (e.g., adding a light source to an image) that can be positioned two-dimensionally. At 612, the user can specify a horizontal positional value (e.g., an x value) of −0.67 and a vertical positional value (e.g., a y value) of 0.00. As depicted, the user can hold the vertical positional value constant while increasing the value of the horizontal positional value. As the horizontal positional value is increased, the transformation can apply light from the light source to a different position of the image. For example, as the x value slowly increases, the position of the light source in images 612-620 moves from the right to the left.

It should be noted that the position of a transformation (e.g., the light source, etc.) can additionally be specified in three dimensions in the user-specified conditioning vector. As an example, a depth parameter (e.g., a z value) can be added as an additional parameter to alter the depth of the light source in the images. As an example, if image 616 possessed a z value of 1.0, the light source can appear to produce light from behind the depicted face of the image.

FIG. 6C depicts a graphical representation of an example day-to-night transformation and weather transformation applied simultaneously to defined characteristics of an input image at different user-desired values according to example embodiments of the present disclosure. 600C depicts two example transformations performed by the machine-learned generator model(s) of the present disclosure. As depicted, a machine-learned generator model(s) can receive a user-specified conditioning vector. The user-specified conditioning vector can include parameterized values the user desires for defined characteristics of the transformations to be applied. In the present example, the user can specify a day-to-night transformation (e.g., transforming daytime lighting conditions to nighttime lighting conditions) and a weather transformation (e.g., adding rain conditions to the image, etc.). Each of the two transformations can be applied at varying degrees based on the values included in the user-specified conditioning vector. Image 622 depicts the input image before transformations are applied by the machine-learned model (or, as an example, where the user-specified conditioning vector provides values of 0 for both transformations). Images 624 depicts the input image after the day-to-night transformation has been applied at a value p1 of 0.25 and the weather transformation has been applied at a value p2 of 0.25. As depicted, the user can gradually increase the values associated with the transformation (p1 and p2) to increase the degree of transformation applied. For example, as the p1 and p2 values gradually increase, the images 624-630 are transformed to include higher degrees of nighttime lighting conditions and rainy weather conditions (e.g., darker clouds, falling rain, etc.), while image 630 depicts both transformations fully applied to the image.

Figure 7:
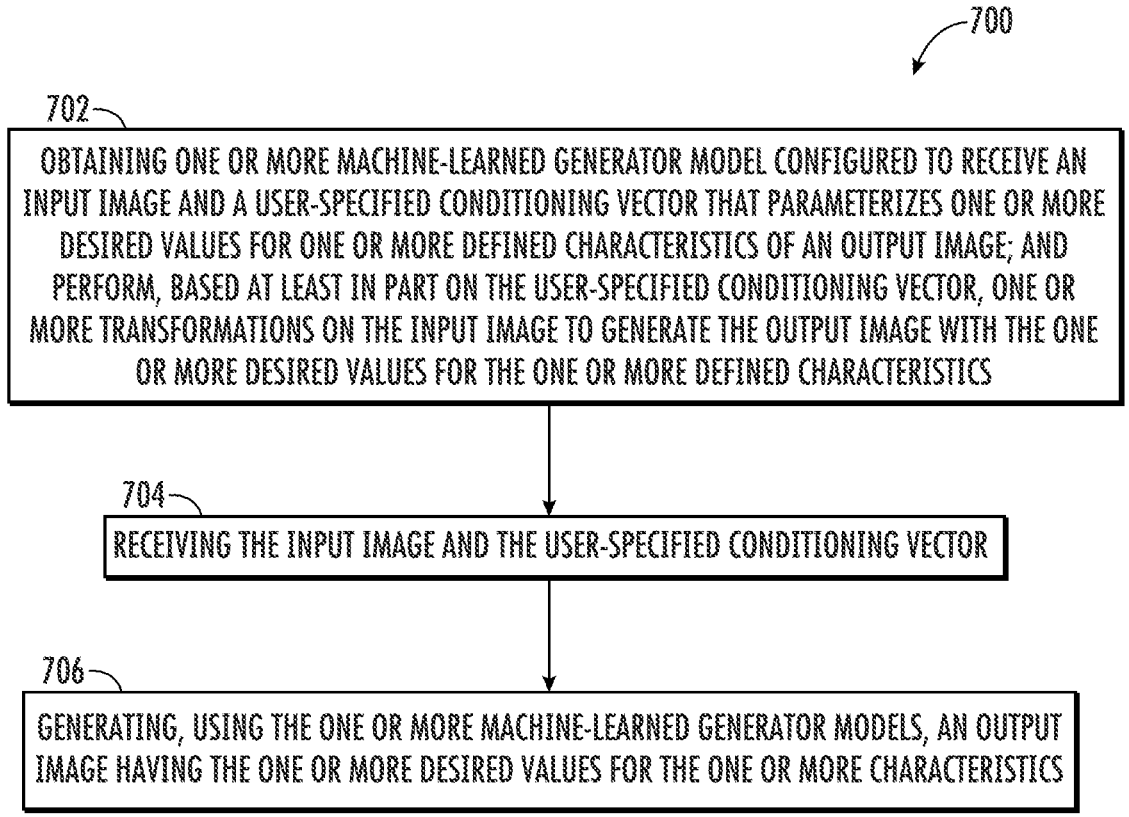
FIG. 7 is a flowchart depicting an example method of generating a reconstruction of the input image in accordance with example embodiments of the present disclosure.

FIG. 7 is a flowchart depicting an example method for training one or more machine-learned models in accordance with example embodiments. The method 700 can be implemented, for instance, using computing device(s) of FIG. 1. FIG. 7 depicts steps performed in a particular order for purposes of illustration and discussion. Those of ordinary skill in the art, using the disclosures provided herein, will understand that various steps of any of the methods described herein can be omitted, rearranged, performed simultaneously, expanded, and/or modified in various ways without deviating from the scope of the present disclosure.

At 702, the method 700 includes obtaining one or more machine-learned generator models. The machine-learned generator model(s) can be configured to receive an input image and a user-specified conditioning vector that parameterizes one or more desired values for one or more defined characteristics of an output image. The machine-learned generator model(s) can be further configured to perform, based at least in part on the user-specified conditioning vector, one or more transformations on the input image to generate the output image with the one or more desired values for the one or more defined characteristics. The machine-learned generator model(s) can be or otherwise include one or more neural networks (e.g., deep neural networks) or the like. Neural networks (e.g., deep neural networks) can be feed-forward neural networks, convolutional neural networks, residual neural networks, and/or various other types of neural networks.

At 704, the method 700 can include receiving the input image and the user-specified conditioning vector. The input image can be a digital image (e.g., a digital image captured by a digital image capture device, etc.). The user-specified conditioning vector can parameterize one or more desired values for one or more defined characteristics of an output image. In some implementations, the user-specified conditioning vector can be a real and continuously valued vector. As an example, the vector can include values (e.g., parameterized user-desired values) that are both real and continuous (e.g., 0.5, 1, 0.2235, −5, etc.), the values corresponding to one or more desired characteristics of the output image. At 706, the method 700 can include generating, using the one or more machine-learned generator models, an output image having the one or more desired values for the one or more characteristics. The defined characteristics of the output image can describe one or more feature(s), style(s), content(s), or any other aspect(s) of the output image. In some implementations, the defined characteristics can include a style characteristic that describes one or more stylistic transformation(s) to perform on the input image. As an example, a digital image generated by a digital camera can be transformed to a painting (e.g., an image to painting transformation). The machine-learned generator model can be trained so that the style transformation can replicate various styles of known artists (e.g., Monet, Van Gogh, Picasso, etc.). For example, a digital input image generated by a digital camera can be transformed to an output image that replicates the style of Picasso. It should be noted that the aforementioned style transformation can also be performed by the machine-learned generator model in reverse (e.g., transforming a Picasso painting to a "digital image" style). Both of the aforementioned style transformations can be applied to the input image to a certain degree. For example, an image to painting transformation can be applied to an input image with a desired value of 0.5, which can produce an output image that is partially transformed to a painting style. The style characteristic can describe any sort of subjective and/or objective transformation to apply to the image (e.g., painting style, drawing style, animation style, camera focal length/focal point, etc.).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 4-5 respectively depict steps performed in a particular order for purposes of illustration and discussion, the methods of the present disclosure are not limited to the particularly illustrated order or arrangement. The various steps illustrated in FIGS. 4-5 can be omitted, rearranged, combined, and/or adapted in various ways without deviating from the scope of the present disclosure.

What is claimed is:

1. A computer-implemented method to perform image-to-image translation, the method comprising:
   obtaining, by a computing system comprising one or more computing devices, one or more machine-learned generator models configured to:
      receive an input image and a user-specified conditioning vector that parameterizes one or more desired values for one or more defined characteristics of an output image; and
      perform, based at least in part on the user-specified conditioning vector, one or more transformations on the input image to generate the output image with the one or more desired values for the one or more defined characteristics;
   receiving, by the computing system, the input image and the user-specified conditioning vector; and
   generating, by the computing system and using the one or more machine-learned generator models, an output image having the one or more desired values for the one or more defined characteristics.

2. The computer-implemented method of claim 1, wherein the one or more defined characteristics comprise one or more real-world characteristics.

3. The computer-implemented method of claim 1, wherein the user-specified conditioning vector describes a degree to which the one or more transformations are applied.

4. The computer-implemented method of claim 1, wherein the one or more defined characteristics comprise:
   light characteristics;
   at least one light source location characteristics;
   environmental characteristics;
   color characteristics;
   style characteristics; and
   feature characteristics.

5. The computer-implemented method of claim 1, wherein the one or more machine-learned generator models comprise an encoder portion and decoder portion, wherein the user-specified conditioning vector is provided to the decoder portion of the one or more machine-learned generator models.

6. The computer-implemented method of claim 1, further comprising:
   training, by the computing system, at least one of one or more machine-learned discriminator models based at least in part on a difference between the output image and a ground truth associated with the output image.

7. The computer-implemented method of claim 1, wherein the input image is a digital photograph.

8. The computer-implemented method of claim 1, wherein the output image comprises a different image style than the input image.

9. The computer-implemented method of claim 1, wherein the output image comprises one or more modified features of the input image.

* * * * *